(No Model.)
D. CLARK & J. LEE.
DRILL FRAME.
No. 269,010. Patented Dec. 12, 1882.
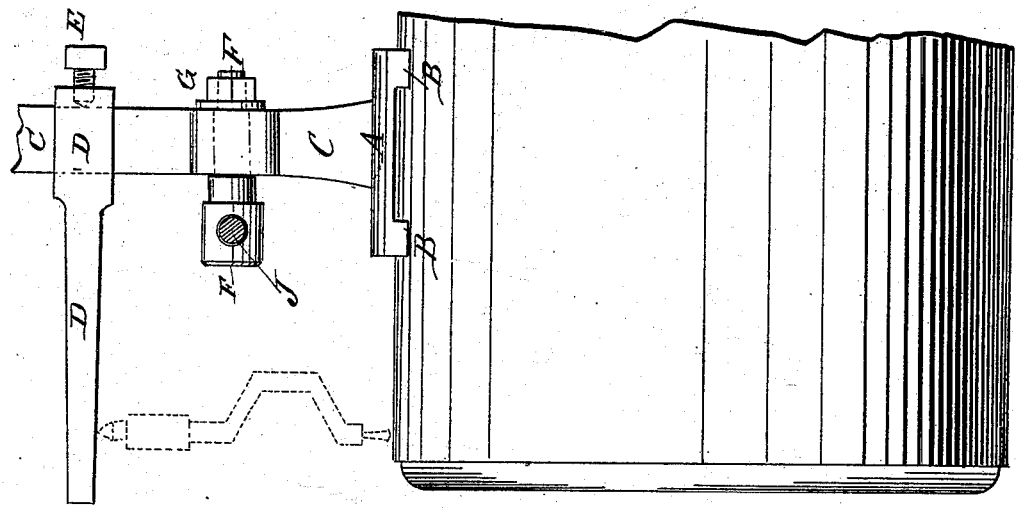
Fig. 2.
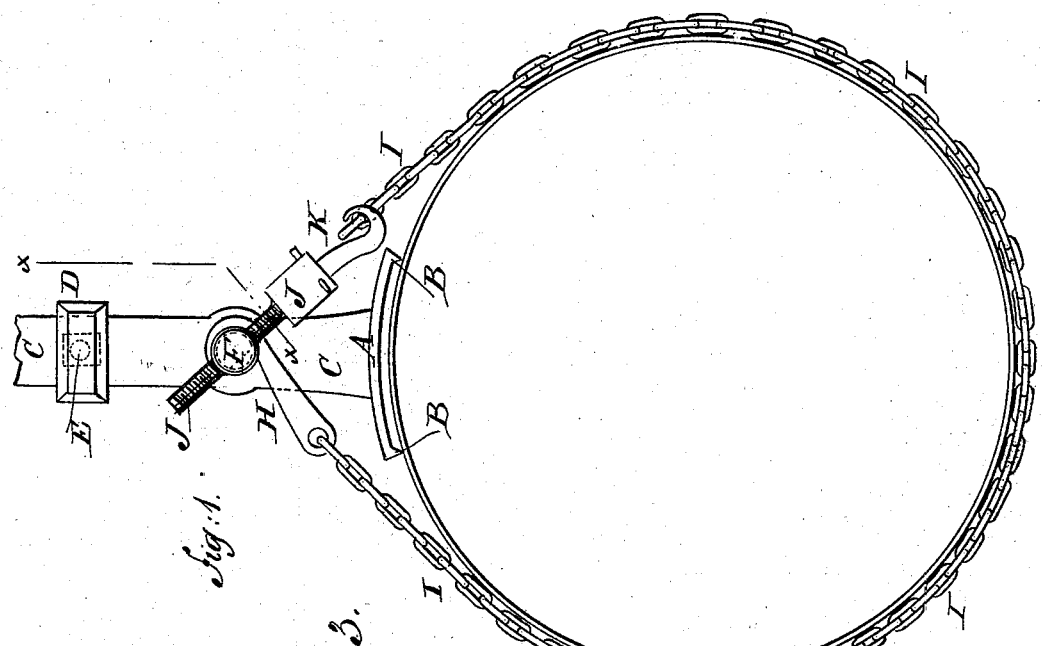
Fig. 1.      Fig. 3.
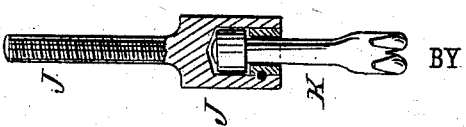
WITNESSES:
Chas. Nida
C. Sedgwick
INVENTOR:
D. Clark
J. Lee
BY Munn & Co
ATTORNEYS.
N. PETERS, Photo-Lithographer, Washington, D. C.

UNITED STATES PATENT OFFICE.

DAVID CLARK AND JOHN LEE, OF HAZLETON, PENNSYLVANIA.

DRILL-FRAME.

SPECIFICATION forming part of Letters Patent No. 269,010, dated December 12, 1882.

Application filed August 2, 1882. (No model.)

*To all whom it may concern:*

Be it known that we, DAVID CLARK and JOHN LEE, both of Hazleton, in the county of Luzerne and State of Pennsylvania, have invented a new and useful Improvement in Drill-Frames, of which the following is a full, clear, and exact description.

Reference is to be had to the accompanying drawings, forming part of this specification, in which similar letters of reference indicate corresponding parts in all the figures.

Figure 1 is a front elevation of our improvement, shown as applied to a steam-boiler. Fig. 2 is a side elevation of the same, the chain being removed, and the swiveled screw being shown in section through the line $x\,x$, Fig. 1. Fig. 3 is a side elevation, partly in section, of the swiveled screw and claw-hook.

The object of this invention is to facilitate the drilling of holes in steam-boilers for the attachment of machinery.

The invention consists in a drill-frame constructed with a base having points or claws, and a standard provided with an adjustable arm, and an arbor placed at a point above the base. A chain is connected with the arbor at one end by a hook and at the other end by a swiveled screw and a claw-hook, whereby the chain can be readily drawn taut to hold the drill-frame securely in place, as will be hereinafter fully described.

A represents the base of the drill-frame, usually called "old man" in machine-shops. The base A has downwardly-projecting points or claws B upon its corners, and is slightly curved, to better adapt it to rest upon the shell of a boiler.

Upon the base A is formed, or to it is rigidly attached, a standard, C, upon which is placed the eye of the arm D. The arm D is designed to receive and support the drill-stock, as indicated in dotted lines in Fig. 2, and is secured in place adjustably by a set-screw, E, so that by loosening the said set-screw the arm D can be adjusted higher or lower, or can be swung around upon the said standard C, as may be desired, so that holes can be drilled anywhere in the boiler-shell within the sweep of the arm D without its being necessary to move the drill-frame.

In the standard C, at a suitable distance above the base B, is formed a hole to receive the arbor F, which is secured in place by a nut, G, screwed upon its end.

Upon the arbor F is formed a neck to receive a hook, H, formed upon or attached to the end of a chain, I, or to receive a large link or ring formed upon or attached to the said end of the chain.

In the head of the arbor F is formed a screw-hole to receive the screw J, to the head of which is swiveled the stem of the claw-hook K. The stem of the claw-hook K can have a head formed upon or attached to it, to be inserted in a socket in the head of the screw J, where it is secured in place by a sleeve placed upon the said stem within the outer part of the said socket, and secured to the said screw by a pin, as shown in Figs. 1 and 3; or the claw-hook K can be swiveled to the said screw by any other suitable means.

In using the drill-frame the base A is placed upon the boiler in the desired position. The chain I is hooked upon the arbor F, is passed around the boiler, is drawn tight, and is hooked upon the claw-hook K. The screw J is then turned to tighten the chain I and draw the drill-frame down upon the boiler with any desired force, so that it will be held firmly against the push of the drill-stock. With this construction, the point of connection between the chain I and the standard C being above the base, the drill-frame will be held much more firmly than it can be when the said chain is connected with the said drill-frame at its base in the ordinary manner.

Having thus described our invention, what we claim as new, and desire to secure by Letters Patent, is—

1. A drill-frame constructed substantially as herein shown and described, and consisting of the base A, having points or claws B, the standards C, having adjustable arm D, the arbor F, the chain I, the claw-hook K, and the swiveled screw J, as set forth.

2. In a drill-frame, the combination, with the chain I and arbor F, of the swiveled screw J and the claw-hook K, substantially as herein shown and described, whereby the chain can be readily drawn taut to hold the drill-frame firmly in place, as set forth.

DAVID CLARK.
JOHN LEE.

Witnesses:
JOHN A. BARTON,
C. BACHMAN.